A. G. WOOD.
SWING FAN.
APPLICATION FILED JAN. 12, 1917.

1,245,849.

Patented Nov. 6, 1917.

Inventor
Allen G. Wood.
By Victor J. Evans
Attorney

Witnesses
Thos. B. Roscow
Wm. R. Smith

UNITED STATES PATENT OFFICE.

ALLEN G. WOOD, OF BEAVER FALLS, PENNSYLVANIA.

SWING-FAN.

1,245,849.  Specification of Letters Patent.  Patented Nov. 6, 1917.

Application filed January 12, 1917. Serial No. 142,050.

*To all whom it may concern:*

Be it known that I, ALLEN G. WOOD, a citizen of the United States, residing at Beaver Falls, in the county of Beaver and State of Pennsylvania, have invented new and useful Improvements in Swing-Fans, of which the following is a specification.

This invention relates to an improvement on my co-pending application Serial Number 14,605, filed March 15, 1915 and has for its primary object to dispense with certain elements and to provide a noiseless apparatus with a minimum number of parts.

An object of the invention is the novel manner of associating the spring and clutch so as to minimize space and to insure the instant operation of such elements.

Besides the above my invention is distinguished in the manner of connecting the main element of the clutch to the shaft so that upon removal of a part, the apparatus will be rendered inoperative for obvious reasons.

With these and other objects in view the invention will be better understood from the following detail description taken in connection with the accompanying drawing wherein:—

Figures 1, 2, 3:
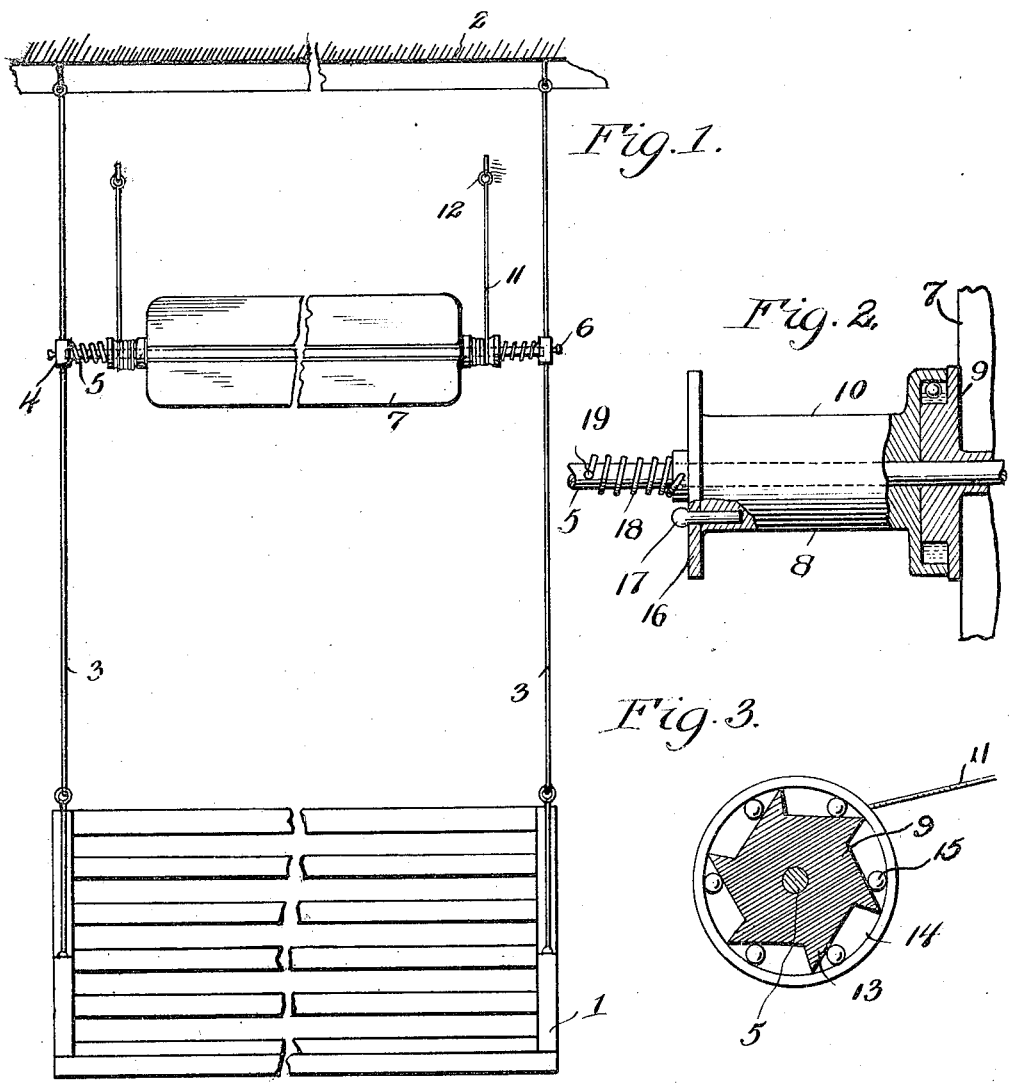
Figure 1 is a front elevation of the swing showing my invention applied thereto.
Figs. 2 and 3 are detail views of the clutch mechanism.

Referring to the drawing the numeral 1 designates a seat connected to the ceiling 2 by means of the links 3. Slidably mounted upon the links 3 are the eyes 4 of a rod 5. This rod is held against movement by set screws 6 threaded into the eyes and binding against the links 3. Loosely mounted on the rod is a fan 7 driven in one direction only in the movement of the swing in a manner now to be described.

At this point I wish to call attention to the fact that although I show two independent mechanisms for driving the fan one may be dispensed with as I have found out from practical experience that one is capable of rotating the fan. The mechanism consists of a clutch 8 the auxiliary element 9 of which being rigidly connected to the fan and the main element 10 loosely mounted on the rod in the form of a drum so as to have wrapped therearound the flexible element 11 one end of which is supported in a stationary manner as indicated at 12. In this particular instance the auxiliary element 9 is formed with tangentially arranged projections 13 mounted within a circular recess 14 within the element 10 and coöperating with balls 15.

From this arrangement it will be seen that in the rotation of the member 10 in one direction the balls will cause a binding action between the projections 13 and the wall of the recess; whereas in the movement of the element 10 in the opposite direction the balls will move to a position to prevent this binding action.

To complete the invention I loosely mount upon the rod a disk 16 through which and into the element 10 passes a pin 17 so as to assure the movement of the disk and element 10 as a unit. This disk has connection with one end of a coil spring 18 that is wrapped around the rod and has its remaining end secured to the rod as illustrated at 19, thus it will be seen that upon removal of the pin 17 the spring will not be tensioned in the movement of the drum.

When the swing moves in a forward direction the element 11 rotates the member 10 of the clutch in a direction to cause the balls to assume a position to effect a binding action between the two members of the clutch and as a result the fan is rotated in a predetermined direction. In the return of the swing the element 11 tends to slacken, but this action is prevented by the tension of the spring 18 acting upon the member 10 through the disk 16; thus it will be seen that the fan will be rotated in one direction only and the element 11 always held taut so as to insure the immediate transmission of energy to the fan 7 in the forward movement of the swing.

It is of course to be understood that when the clutch moves in a direction to rotate the fan the spring is being put under tension so that the energy thereof may be utilized to wrap the member 11 around the clutch in the return movement of the swing.

It is to be understood that the structural embodiment of the invention as a whole and its various features as shown is merely illustrative and not restrictive, since I am well aware that many of the details of construction can be widely varied without departing from the spirit of the invention. I therefore do not desire to be limited in these particulars or in any others, except as set forth in the appended claims.

What I claim is:

1. In combination with a swing having supporting links, a fan apparatus comprising a rod adjustably connected to the links, a fan loosely mounted on the rod, a clutch member having its auxiliary element rigidly connected to the fan and its main element loosely mounted on the rod, a disk loosely mounted on the rod and having a detachable connection with the main element, a yieldable connection between the disk and shaft and means for turning the main element in the movement of the swing.

2. In an apparatus of the class described in combination a fan, a rod supporting the fan for rotation and a clutch member having one element rigidly connected to the fan and the other element loosely mounted on the rod, a disk loosely mounted on the rod, a fastening device connecting the disk to the clutch and a coil spring having one end attached to the rod and the other end to said disk.

In testimony whereof I affix my signature.

ALLEN G. WOOD.

Copies of this patent may be obtained for five cents each, by addressing the "Commissioner of Patents. Washington, D. C."